United States Patent
Stone et al.

(10) Patent No.: US 6,274,839 B1
(45) Date of Patent: Aug. 14, 2001

(54) METHOD AND APPARATUS FOR BUILDING UP A WORKPIECE BY DEPOSIT WELDING

(75) Inventors: Kevin H Stone, Derby; Nigel P Pearce, Ashby de la Zouch, both of (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/450,685

(22) Filed: Nov. 30, 1999

(30) Foreign Application Priority Data

Dec. 4, 1998 (GB) ............................................ 9826728

(51) Int. Cl.$^7$ .............................. B23K 9/04; B23K 9/12
(52) U.S. Cl. ..................... 219/76.12; 219/76.14; 219/125.1; 219/125.11
(58) Field of Search .............................. 219/76.12, 76.14, 219/76.1, 125.1, 125.11; 901/42

(56) References Cited

U.S. PATENT DOCUMENTS

| | | | |
|---|---|---|---|
| 2,191,481 | 2/1940 | Hopkins | 22/203 |
| 3,596,041 | 7/1971 | Frus et al. | 219/76 |
| 3,665,143 | 5/1972 | Ujiie | 219/76 |
| 3,696,228 | 10/1972 | Thomas, Jr. et al. | 219/76 |
| 3,895,209 | 7/1975 | Moriki et al. | 219/76 |
| 3,914,851 | 10/1975 | Ujiie | 29/412 |
| 4,146,162 | 3/1979 | Skakunov | 228/6 R |
| 4,233,487 | 11/1980 | Moriki et al. | 219/76.11 |
| 4,353,689 | 10/1982 | Fernandez et al. | 432/225 |
| 4,445,022 | * 4/1984 | Mori | 219/125.1 |
| 4,629,860 | * 12/1986 | Lindbom | 219/125.1 |
| 4,660,756 | 4/1987 | Geisseler | 228/184 |

(List continued on next page.)

FOREIGN PATENT DOCUMENTS

| | | |
|---|---|---|
| 34-38-634-A1 | 4/1986 | (DE) . |
| 0-049-899-A1 | 4/1982 | (EP) . |
| 0-163-828-A1 | 12/1985 | (EP) . |
| 0-172-309-A1 | 2/1986 | (EP) . |
| 0-375-114-B1 | 7/1992 | (EP) . |
| 0-522-336-A1 | 1/1993 | (EP) . |
| 0-529-816-A1 | 3/1993 | (EP) . |
| 0-554-033-A1 | 8/1993 | (EP) . |
| 0-585-502-A1 | 3/1994 | (EP) . |
| 2-038-684-A | 7/1980 | (GB) . |
| 2-085-786-A | 5/1982 | (GB) . |
| 2-294-227-A | 4/1996 | (GB) . |
| WO 94/26446 | 11/1994 | (WO) . |

*Primary Examiner*—Tom Dunn
*Assistant Examiner*—Zidia Pittman
(74) *Attorney, Agent, or Firm*—Oliff & Berridge, PLC

(57) ABSTRACT

A method of forming an article comprising in combination the steps of: constructing in a computer (6) memory a first datafile 60 which is a definition of a three dimensional volume model of an article;

executing a computer program (42), which reads the first datafile (60) and performs an algorithm which deconstructs the three dimensional volume model to produce a second datafile (62) comprising a string of sequential relative spatial co-ordinates describing a tool path (90,91) through the three dimensional volume model of the article;

operating a multi-axis welding robot (2) to position the welding head (16) relative to the worktable (12) such that the relative movement follows the path (90,91) defined by the second datafile (62). The operation of the welding head (16) also being controlled to deposit a weld bead as it follows at least a part of the path to build up a solid representation of the three dimensional volume model of the article. The three dimensional volume model of the article being deconstructed by directing a computer representation of a tool within the algorithm to remove a succession of incremental volume portions from the three dimensional volume model of the article.

24 Claims, 5 Drawing Sheets

U.S. PATENT DOCUMENTS

| | | | |
|---|---|---|---|
| 4,675,502 | * | 6/1987 | Haefner et al. ............... 219/124.34 |
| 4,782,206 | | 11/1988 | Ayres et al. ..................... 219/76.14 |
| 4,842,186 | | 6/1989 | Doyle et al. ........................ 228/222 |
| 4,857,694 | | 8/1989 | Doyle et al. ..................... 219/76.12 |
| 5,203,944 | | 4/1993 | Prinz et al. ......................... 156/247 |
| 5,207,371 | * | 5/1993 | Prinz et al. ......................... 228/125 |
| 5,233,150 | | 8/1993 | Schneebeli et al. ............. 219/76.14 |
| 5,281,789 | | 1/1994 | Merz et al. ...................... 219/76.15 |
| 5,301,863 | | 4/1994 | Prinz et al. ............................. 228/33 |
| 5,399,836 | | 3/1995 | Carpenter et al. ............. 219/125.11 |
| 5,432,704 | | 7/1995 | Vouzelaud et al. ............ 364/474.24 |
| 5,510,066 | | 4/1996 | Fink et al. ......................... 264/40.1 |
| 5,622,638 | | 4/1997 | Schell et al. .................... 219/121.64 |
| 6,133,545 | * | 10/2000 | Okazaki et al. ............... 219/124.34 |
| 6,167,328 | * | 12/2000 | Takaoka et al. ..................... 700/264 |

\* cited by examiner

METHOD AND APPARATUS FOR BUILDING UP A WORKPIECE BY DEPOSIT WELDING

The present invention is concerned with a method and apparatus for building up a workpiece exclusively or predominately by deposit welding. In particular the invention relates to the method of controlled deposition of metal variously called free-form welding, shaped metal deposition, rapid prototyping by welding or other such names.

An example of a method of controlled weld deposition of metal referred to above is described in U.S. Pat. No. 5,233,150 (equivalent EP-A-0,496,181). There are also a large number of other publications, some of earlier date, which disclose similar methods. The reader will be assumed therefore in the interests of brevity to be familiar with the basic techniques of this process. In summary though, according to such known methods a 3D CAD (Computer Aided Design) model of the workpiece, containing details of its geometry, is produced. This CAD model of the workpiece is then sliced within a computer system into a number of distinct planar layers. For each layer the computer system determines a course of weld runs necessary to form that layer. Typically this comprises an outline of each layer and a pattern of weld runs to fill in the layer. A welding torch, which is carried by a multi-axis robot guided by a computer control system, is then programmed to follow this course of weld runs thereby depositing a layer of the workpiece in metal. The workpiece is accordingly built up in a series of layers, one on top of the other, starting from a first layer which is deposited upon a worktable of the welding robot.

The computer programs for slicing a 3D CAD model into a number of layers for subsequent use in the methods described above are not generally available, and tend to be complex and cumbersome in their practical application to the fabrication of complex practical workpieces and components. The methods of controlling the robot welding equipment associated with prior art methods of deposit welding are also cumbersome and not ideal. Consequently there is considerable complexity and a large manual input is generally required.

It is therefore desirable to provide an improved method and apparatus for controlling and programming a robot used for building up a workpiece by deposit welding which addresses the above problems and/or offers improvements generally.

According to a first aspect of the present invention there is provided a method of forming an article comprising in combination the steps of:

constructing in a computer memory or equivalent data storage means a first datafile which is a definition of a three dimensional volume model of an article;

executing a computer program, within a computer, which reads the first datafile and performs an algorithm which deconstructs the three dimensional volume model defined by the first datafile and produces a second datafile comprising a string of sequential relative spatial co-ordinates describing a tool path through the three dimensional volume model of the article;

operating a multi-axis welding robot comprising a worktable, worktable drive means, robot arm, welding head disposed on said robot arm, and control means that are arranged to control the movement of the welding robot and so of the welding head relative to the worktable, the control means utilising said second datafile to position the welding head relative to the worktable such that the relative movement follows the path defined by the second datafile, the operation of the welding head also being controlled to deposit a weld bead as it follows at least a part of the path to build up a solid representation of the three dimensional volume model of the article;

characterised in that the three dimensional volume model of the article is deconstructed by directing a computer representation of a tool within the algorithm to remove a succession of incremental volume portions from the three dimensional volume model of the article.

Preferably the deconstruction of the three dimensional model is executed using a computer aided machining system. The computer representation of the tool may be a representation of a milling cutter which removes a comparable incremental volume as is deposited by the welding head.

According to a second aspect of the present invention there is provided a method of forming an article comprising in combination the steps of:

constructing in a computer memory or equivalent data storage means a first datafile which is a definition of a three dimensional volume model of an article;

executing a computer program, within a computer, which reads the first datafile and performs an algorithm which deconstructs the three dimensional volume model defined by the first datafile and produces a second datafile comprising a string of sequential relative spatial co-ordinates describing a tool path through the three dimensional volume model of the article;

operating a multi-axis welding robot comprising a worktable, worktable drive means, robot arm, welding head disposed on said robot arm, and control means that are arranged to control the movement of the welding robot and so of the welding head relative to the worktable, the control means utilising said second datafile to position the welding head relative to the worktable such that the relative movement follows the path defined by the second datafile, the operation of the welding head also being controlled to deposit a weld bead as it follows at least a part of the path to build up a solid representation of the three dimensional volume model of the article;

characterised in that the second datafile comprises a string of x,y,z co-ordinates representing the relative position of the tool along the path and for each x,y,z, co-ordinates a corresponding set of i,j,k co-ordinates which together with the respective x,y,z co-ordinates define a tool vector which represents the relative spatial orientation of the tool at a particular tool position along the path.

A fixed plane may be defined within the computer or the control means and the robot is controlled to position the tool within this plane such that the relative x,y,z co-ordinates and relative i,j,k co-ordinates are within this plane. The worktable may be rotated to bring the article within said welding plane.

Preferably the welding head is arranged in use to be substantially vertical during operation of the welding head to deposit a weld bead and the worktable is tilted to provide a required relative tool orientation.

The robot may have more degrees of freedom of movement than are defined by the algorithm that deconstructs the three dimensional volume model of the article, and the method may include the additional step of executing an interface computer program within a computer which reads the second datafile and performs a further algorithm which uses further user specified constraints on the movement of the robot to alter the second data file before it is used by the robot control means.

Preferably the further user specified constraints specify a rotational position and orientation of the tool about a tool vector. Furthermore the rotational position and orientation of the tool about a tool vector may be aligned with the direction of movement of the tool relative to the article, during at least part of the operation of the robot. Alternatively the rotational position and orientation of the tool about a tool vector may, during at least part of the operation of the robot, be fixed relative to the robot.

The algorithm which deconstructs the three dimensional volume model may define up to five degrees of freedom of movement of the robot.

Preferably the robot has more axes of movement than are defined by the algorithm that deconstructs the three dimensional volume model of the article, and the method includes the additional step of executing an interface computer program within a computer which reads the second datafile and performs a further algorithm which uses further user specified constraints on the movement of the robot about its axes to alter the second data file before it is used by the robot control means. The robot may have nine axis of movement.

Preferably the three dimensional volume model of the article defined in the first datafile is first broken into a number of sections and each section is then recorded in separate first datafiles which are then operated on in sequence by the further steps of the method. Further any axis-symmetric shapes contained within the three dimensional volume model of the article may be identified within the algorithm which deconstructs the three dimensional volume model and instructions may be added to the second datafile such that the control means is directed to rotate the worktable of the robot to produce such shapes.

Preferably the algorithm that deconstructs the three dimensional volume model of the article constrains the tool to be substantially normal to the path defined through the article.

Preferably the welding head deposits a metal weld bead. Preferably an electric arc welding head is used. A Metal Inert Gas (MIG) welding head may be used. Alternatively a Tungsten Inert Gas (TIG) welding head may be used. A laser welding head may also alternatively be used.

The present invention will now be described by way of example with reference to the following figures in which.

Figure 1:
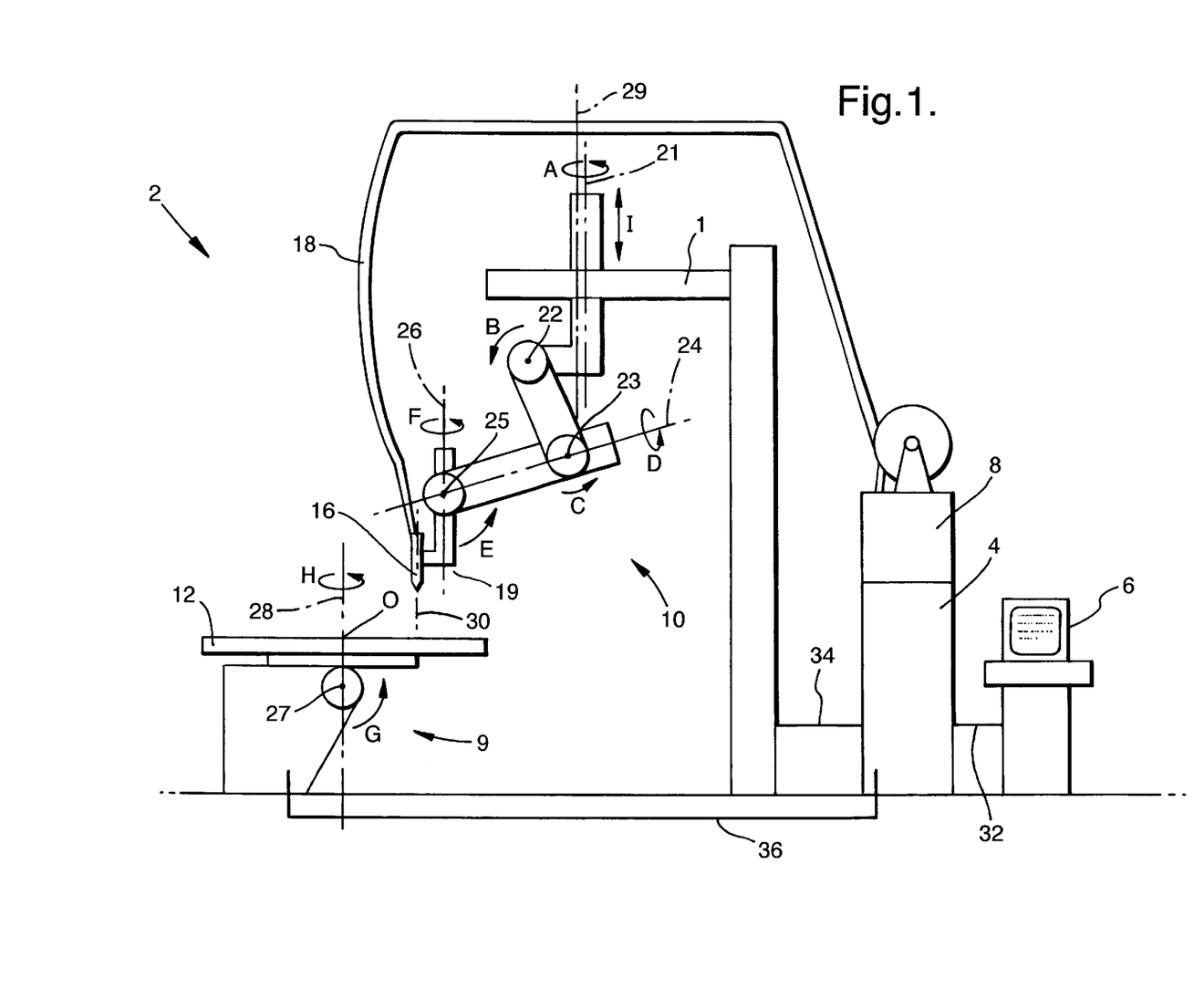
FIG. 1 shows a schematic illustration of the apparatus used in an embodiment of the present invention.

FIG. 1 shows the equipment for building up a metal component by deposit welding. A computer 6 sends commands, via a control line 32, to a robot controller 4 which controls and drives a welding robot 2, via control lines 34,36. The robot 2 comprises a robot arm 10, mounted in a hanging position from a gantry 1, and a rotary/tilting work table module 9. Upon the end 19 of the robot arm 10 there is a welding torch 16 which is connected to suitable welding equipment 8, which is also controlled by the robot controller 4 and the computer 6. The welding torch 16 is arranged, under the control of the robot controller 4 and computer 6, to deposit weld material onto a work table 12 of the work table module 9 in order to build up a component (not shown) in metal.

The robot arm 10 comprises a number of interconnected sections that are moved relative to each other by actuators (not shown) operated under the control of the robot controller 4. The robot arm 10 is capable of movement about six disposed axes 21,22,23,24,25,26. The movement of the various sections of the arm 10, about the axes 21 to 26 are shown by arrows A,B,C,D,E,F. The arm 10 as a whole can also move vertically relative to the gantry 1, along axis 29 as shown by arrow I. The work table module 9 is mounted in front of, and within the area of operation of the arm 10. Further actuators (not shown) within this module 9 provide for rotation, shown by arrow H, of the work table 12 about a further axis 28, and tilting of the work table 12, shown by arrow G, about axis 27. The rotary axis 28 being mounted upon the tilting axis 27. The robot 2 as a whole therefore has nine axes of movement 21,22,23,24,25,26,27,28,29 and can position and orientate the welding torch 16 relative to the work table 12, and any component thereon, with a considerable degree of flexibility. The use of a nine axis machine in particular enables the component and welding torch to be positioned in the correct relative position and orientation whilst also keeping the welding torch vertical, or near vertical. It being known in the art that it is advantageous during deposit welding to keep the welding torch 16 vertical to improve the deposit of the weld material and help ensure that the molten weld material is deposited onto the work table 12 or component.

An example of such a nine axis robot 2 is produced by Reis Robotics GMBh (of Obernburg, Germany) using their Reis SRV16 robot arm mounted in the hanging position from a gantry with 1m of vertical travel, coupled to their Reis RDK26 rotary/tilting table module 9. The whole robot 2 being driven by a Reis robot controller 4.

The welding torch 16 is of an arc welding type, typically MIG (metal inert gas) or TIG (tungsten inert gas). The torch 16 is supplied from the welding equipment 8 with power, welding wire and protective gas via feed 18. It will be appreciated though that other types of welding and welding equipment 8 can be employed, for example laser welding could be used.

Figure 2:
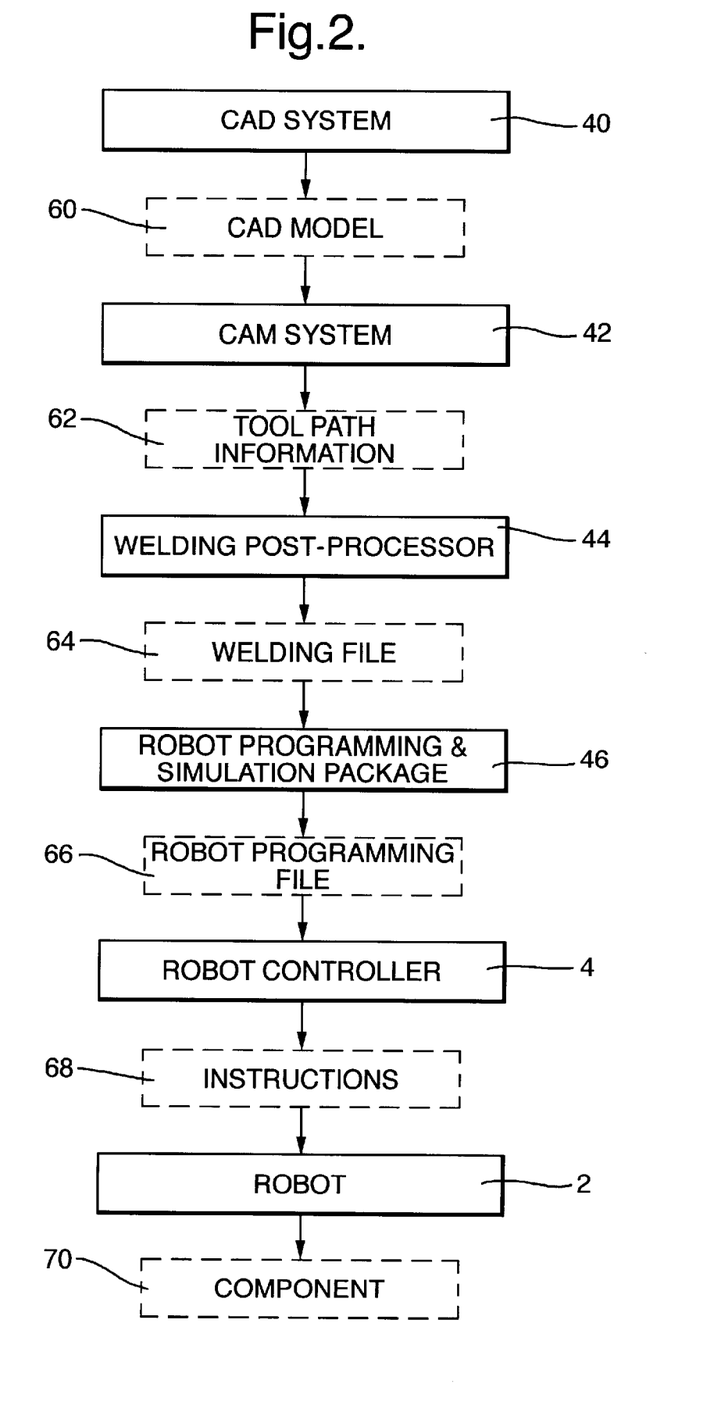
FIG. 2 is a flow chart illustrating the various steps of the method of an embodiment of the present invention.

Referring to FIG. 2 the first step in the method is to produce a CAD (Computer Aided Design) model 60 of the component, in the form of a computer file or data within a computer memory. The CAD model 60 contains all the geometric details (e.g. size, shape, and position) of the component to be produced. Any suitable form of CAD geometry can be used including Wire Frame, Free Form Surface, and Solid Model. The CAD geometry can also be either explicit or in parametric form. The CAD model 60 is produced using a conventional CAD system 40 operating on a suitable conventional computer 6. An example of such a CAD system 40 is CADDS5 (produced by Parametric Technology Corporation of Waltham, Massachusetts, USA) operating on a Hewlett Packard HP 715/100 Workstation computer 6.

In the interests of brevity it is assumed that a skilled man in the art is familiar with such known CAD systems 40. Reference should also be made to the operating manuals of such systems 40 for the general details of such systems 40.

The CAD model 60 is then read into a CAM (Computer Aided Manufacturing) system 42 which is used to produce a weld tool path 90. The weld tool path 90 is the path that the welding torch 16 follows in order to deposit a weld bead in the required shape of the component represented by the CAD model 60. The CAM system 42 used in this method is a conventional computer aided CNC (computer numerically controlled) off-line part programming package for milling or machining applications. Such packages are generally used to define the path a milling cutter or other similar machining tool should take in order to machine an object and volume represented by an inputted geometry. An example of such a system is CVNC, a 2½ to 5 axis milling package also produced by Parametric Technology Corporation of Waltham, Mass, USA. Again in the interests of brevity it is assumed that a skilled man in the art is familiar with such known CAM systems 42 and reference should be made to the operating manuals of such systems 42 for additional general and specific details of these systems 42.

Figure 3:
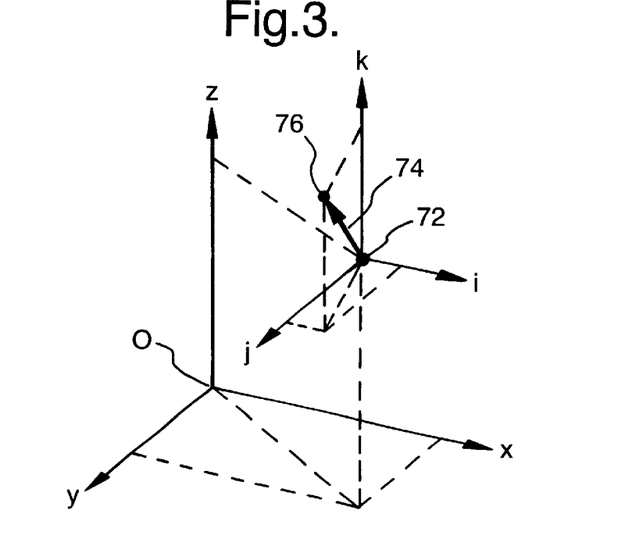
FIG. 3 illustrates the co-ordinate system used in an embodiment of the method of the present invention.

The output 62 from such systems 42 is a computer file, or data within a computer memory, containing a series of x,y,z co-ordinates that define the various positions 72 that the tool should pass through, and i,j,k values for each x,y,z co-ordinate position 72. The i,j,k values define a tool. vector 74, or orientation of the tool at each x,y,z co-ordinate position 72. The relationship between these values and how the i,j,k values define the tool vector 74 is shown in FIG. 3. Basically, the x,y,z co-ordinates define a first point 72 in space away from a fixed origin 0. This origin 0 being the centre of the robot table 12, with the x,y,z axes of this co-ordinate system being fixed relative to, and so rotating and tilting with, the robot table 12. The i,j,k co-ordinates then specify a second point 76 in space away from this first point 72, using this first point 72 as the origin of the i,j,k co-ordinates with the i,j,k axes of this co-ordinate system being aligned with the respective x,y,z axes. A vector 74, the tool vector, is then defined between these two points 72,76. This tool vector 74 representing the orientation of the tool relative to the work table 12 and therefore to the component orientation. Although the x,y,z and i,j,k co-ordinate system shown and described is a Cartesian system with orthogonal axes, it will be appreciated that other suitable co-ordinate systems can equally be used to provide a tool position and a tool vector.

Using the CVNC CAM system 42 a notional cutter is driven around the CAD model 60 of the component by directing the CAM system 42 to mill or machine the geometry and internal volume of the CAD Model 60. This can either be done automatically within the CAM system 42 or interactively with the operator adjusting the automatic path produced by the CAM system 42. In effect the CAM system 42 is directed to machine the CAD model 60 from a volume enclosing that CAD model 60. It being appreciated in this invention that a machining path is simply the negative of a deposit path and that the same positional data etc. can be used for both.

Figure 7:
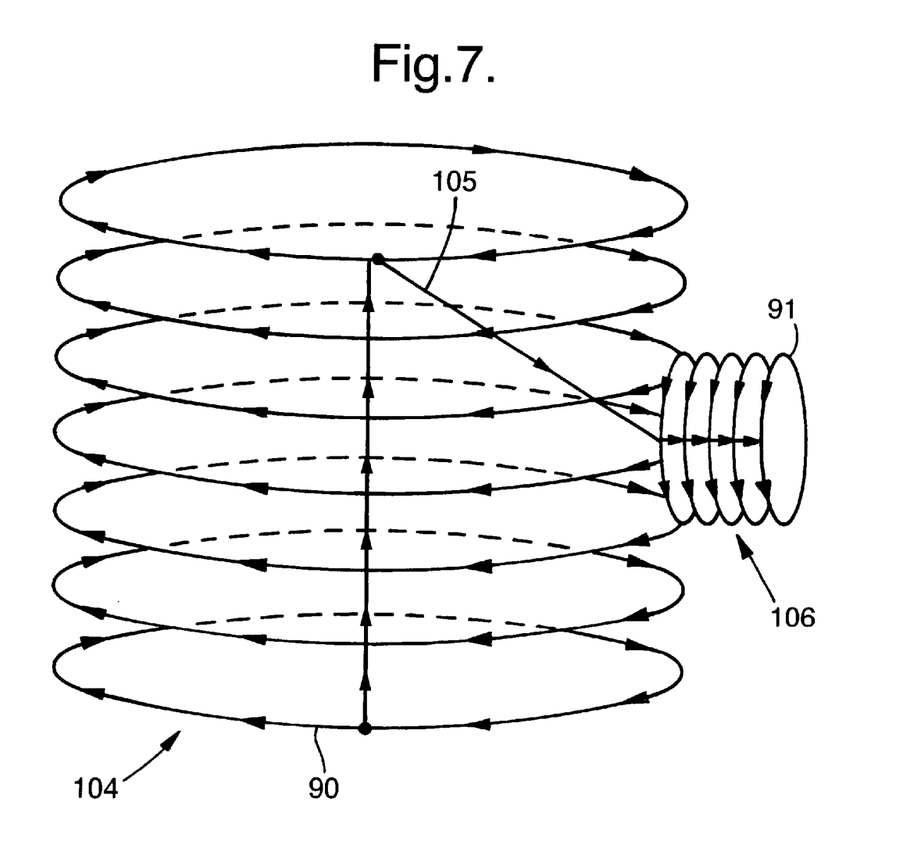
FIG. 7 is a schematic illustration of the tool paths produced by a CAM system from a CAD model.

For complex CAD models 60 the notional cutter is driven around separate sections of the model 60 in stages. This is in a similar way to how the CAM system 42 would be used to produce a conventional machining tool path for a complex component, with the machine tool (cutter) directed to carry out rough machining first and then subsequently machining the required detail. For example to produce a component which has a generally cylindrical main section 104 with a number of radially extending bosses 106 disposed around the outside of the main section 104, the notional cutter of the CAM system 42 is driven around the main cylindrical section 104 first. The notional cutter is then driven around each of the bosses 106. The result of this is a number of machine tool paths 90,91 for each section 104,106 with a linking movement path 105 between them, as shown in FIG. 7. The complete tool paths 90,91 produced in this way for complex CAD models 60 are generally simpler, and easier to produce, than producing a single path 90 for the whole complex CAD model. Where features of the component are repeated within the complex model, for example a number of identical bosses around the main cylindrical section 104 the tool path 90,91 to produce one section or feature can be stored. A translation to the next position can then be set and the path for the repeated similar feature repeated in the new translated position to provide the required tool path information for the further repeated feature. This will reduce the programming time and complexity of the deconstruction by utilising a previously calculated tool path for a particular feature. Furthermore features which are common to a number of different components or articles can be stored and utilised as required to produce those features in different components. For example the path 90,91 to produce a boss can be stored and simply translated into the required position to produce similar bosses on a range of different components.

The individual tool paths 90,91, and orientation of the notional cutter (and so welding torch), for each section 104,106 can also be optimised for the particular shape of that section 104,106. For example in the above example the notional cutter is driven around the bosses 106, and tool path produced 91, substantially perpendicular to the orientation used for the main section 104. Since a CAM machining system 42 is used to produce the tool paths 90,91 for the different sections 104,106 the separate tool paths 90,91 will tend to intersect/overlap. This is because in machining operations a previously machined area is generally used as the starting point for any subsequent machining that is required. In the weld deposition process the weld bead needs to be deposited onto a solid surface. This is either the work table 12 or a previously deposited section. Consequently if the welding tool path 90,91 for a complex CAD model 60 is produced in sections 104,106 these sections 104,106 must intersect/overlap. As can be seen this requirement is fulfilled by using a CAM machining system 42 as described above. This is not necessarily the case with some of the other prior art methods where certain parts of the deposited weld bead have to be separately supported by various support means, as is described for example in U.S. Pat. No. 5,233,150 and EP 0,529,816.

The notional cutter within the CAM system 42, in this method, is used to represent the welding torch 16. Accordingly a cutter is chosen that would remove a similar amount of material as is deposited by the welding torch 16. For example a 6 mm ball end milling cutter is used to represent a welding torch 16 that would deposit a 6 mm wide weld bead. The notional cutter is also set, within the CAM system 42, to be normal to the surface of the component or the worktable 12 in contact with the tip of the tool. This is required since during weld depositing the welding torch 16 is required to be substantially normal to the weld bead deposited.

The parts of the path 90 where the CAM system 42 determines that machining takes place are therefore, according to this method, the areas where weld deposition is required. Consequently the functions of the CAM system 42 that relate to machining can, and are, used, amended and interpreted by the following stages of the control system as welding commands where appropriate. For example CVNC allows an off-set to be used to the notional cutter diameter and if required to its length. This means that the cutter can be programmed to stand-off the geometry by an inputted amount. This is useful within say arc welding where the welding torch 16 is required to be a distance from the component or worktable 12 such that an arc is struck between the tip of the torch 16 and the worktable 12 or component. Within the robot controller oscillation commands also exists which oscillate the tool about a required tool path 90. This command can also be advantageously used when the system is used for deposit welding where such oscillation can be used to deposit a larger section of material about the tool path 90. Such oscillation to deposit in effect a wider bead of material being can be recognised within the CAM package 42 in the form of a wider tool removing a larger amount of material from the model within a single pass.

Conceptually the use of a CAM machining system 42 to produce a tool path 90 for use in deposit welding is very different from the prior art methods of producing such tool paths for use in deposit welding. In the prior art methods, described in U.S. Pat. No. 5,233,150 among others, the CAD model 60 is sliced into a number of layers. This is done by intersecting a plane with a CAD solid model 60 of the component to create additional geometry for each layer. A separate filling strategy is then calculated for the deposit of weld material making up each layer. Such a slicing routine is very time consuming and also is not easily adaptable for different components. For complex CAD models 60 the slicing method may also produce complex and sometimes disjointed profiles, and so tool paths. Such profiles and tool paths are undesirable and may (as described above) require temporary support structures. Furthermore such slicing systems generally only produce x,y,z tool position co-ordinates for the deposit path. They do not produce, or allow for the easy generation of, variable tool vector 74 information, which as will be explained later is required to ensure the correct orientation of the welding torch 16 during welding. The use of a CAM machining system 42 addresses both of these problems and the realisation that such a CAM machining system 42 can be used for deposit welding is an important aspect of the invention. The realisation that a CAM machining system 42 can be useful in deposit welding is based, in part, upon a recognition and appreciation that machining, and the removal of material is the reverse, or negative, of depositing material by welding and that a welding torch 16 can be represented by a suitable cutter.

The output from the CVNC CAM system 42 is a file 62 of the tool path data comprising a series of x,y,z co-ordinates and i,j,k values defining the tool vector 74. The output 62 specifies the path 90 the tool is required to execute. It does not however describe and specify how the robot 2 should execute the required path 90. The output 62 is also not in a form that is understood by the Robot Programming package 46 and/or Robot controller 4. Additionally such CAM systems 42 are generally used to provide tool path information 62 for milling or machining robots. In such milling or machining robots usually only a maximum of five degrees of freedom need to be specified since the cutter rotates in one of the degrees of freedom. For a welding robot though the final, sixth degree of freedom of movement needs to be specified. Furthermore such milling or machining robots have a fewer axes of movement, generally less than the nine axes of the welding robot 2 in this embodiment, and typically only a maximum five axis. For example the CVNC package is designed for use with 2½ to 5 axis milling machines. Consequently further constraints on how the robot 2 should execute the required tool path 90 need to be specified to assist in defining the remaining, sixth degree of freedom (in this case rotation about the tool axis) and assist in specifying the position/movement of the robot axes A to G. Specific commands and functionality required for weld depositing of material to build up a component also need to be provided.

Consequently the tool path information 62 output from the CAM system 42 is transferred to a welding post processor 44. As is known in the art such post-processors 44 convert the output 62 from CAM systems 42 into a form that can be understood by a robot programming package 46, and/or a robot controller 4. The post processor 44 acts upon the tool path information 62, and various keywords included within the tool path information, using various algorithms and rules to produce an output 64. These algorithms and rules being embedded within a conventional computer system. The function of the main algorithms used within the post processor 44 will now be described. It being appreciated that additional algorithms can be added within the post processor 44 to set further control parameters for the control of the robot 2 and the deposit welding. In addition further keywords can be added within the tool path information 62 output. Further algorithms within the post processor 44 operating upon these keywords.

Within the post processor 44 commands related to robot machining and which are common or generic to controlling machine tool and welding robot within the tool path information 62 produced by the CAM system 42 are interpreted and used to control the welding robot. For example commands to start/stop machining within the tool path information 62 output from the CAM package 42 are converted into commands to start and stop the welding robot 2.

Figure 4A:
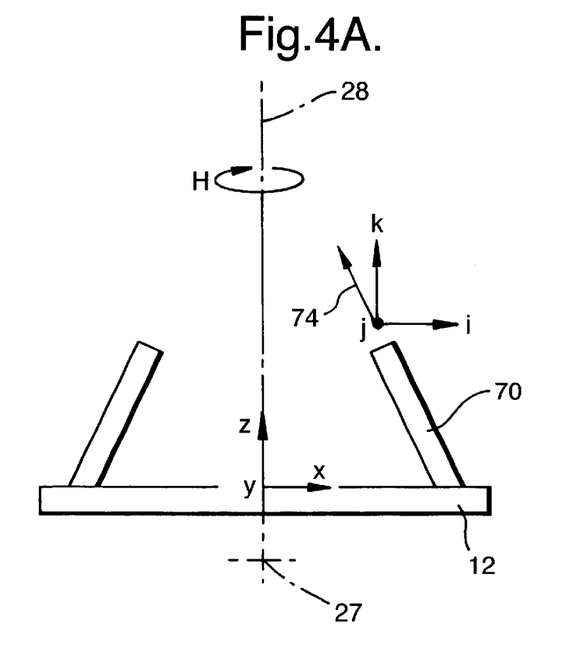
FIGS. 4a and 4b are schematic illustrations of the orientation of a tool vector used within an embodiment of the invention.
Figure 4B:
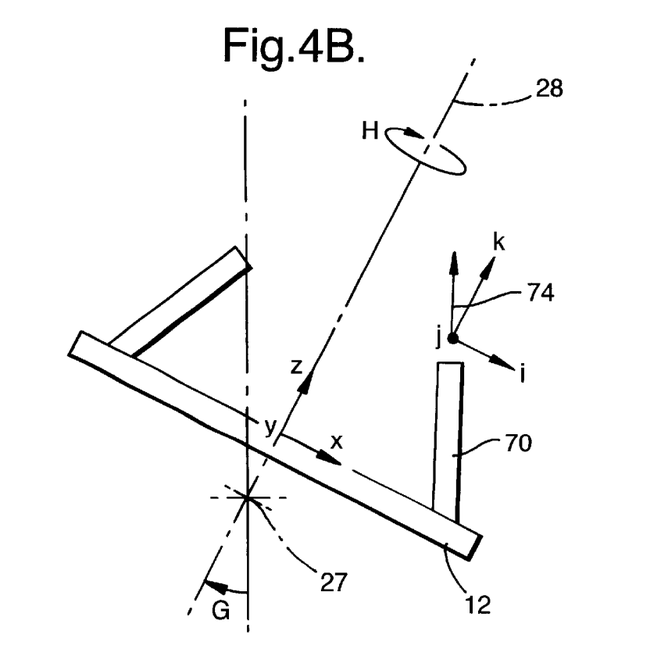

During deposit welding it is important and advantageous to keep the welding torch 16 vertical. To achieve this the Welding post-processor 44 specifies that, during welding the tool vector 74 (which is defined by the i,j,k co-ordinates) has to be vertical. The processor 44 then automatically adjusts the tilt G of the table 12 about axis 27, and rotation H of the table about axis 28 to achieve this criterion and the required orientation of the tool vector 74 relative to the table 12 and component thereon. This is shown. in FIG. 4a and 4b. FIG. 4a shows the orientation of the table 12, a component 70 thereon (in this case a cone shaped component) and the tool vector 74 as determined by the CAM system 42. The orientation of the table is then adjusted within the Welding post-processor 44, as shown in FIG. 4b, so as to keep the tool vector 74 vertical whilst still providing the required orientation relative to the component 70 and table 12.

Algorithms within the Welding post-processor 44 also use a theoretical welding plane 80 to constrain the movement of the welding torch 16. This reduces the complexity of the overall robot control system and provides an additional constraint upon the movement of the welding robot 2 by removing some freedom of movement of the robot 2. By limiting and restricting the movement of the robot 2 to be within a smaller region defined by the welding plane 80 the accuracy is improved, because the movement is less, and repeatability is improved since the robot 2 operates in the same region. The robot 2 can also be better calibrated and any errors within the movement can be accommodated and corrected, again because the movement of the robot 2 during operation is restricted to a controlled, defined region. Furthermore the use of the welding plane 80 ensures that the workpiece is generally moved to the welding torch/tool 16 rather than the robot 2 moving to positions on the workpiece.

Figure 5:
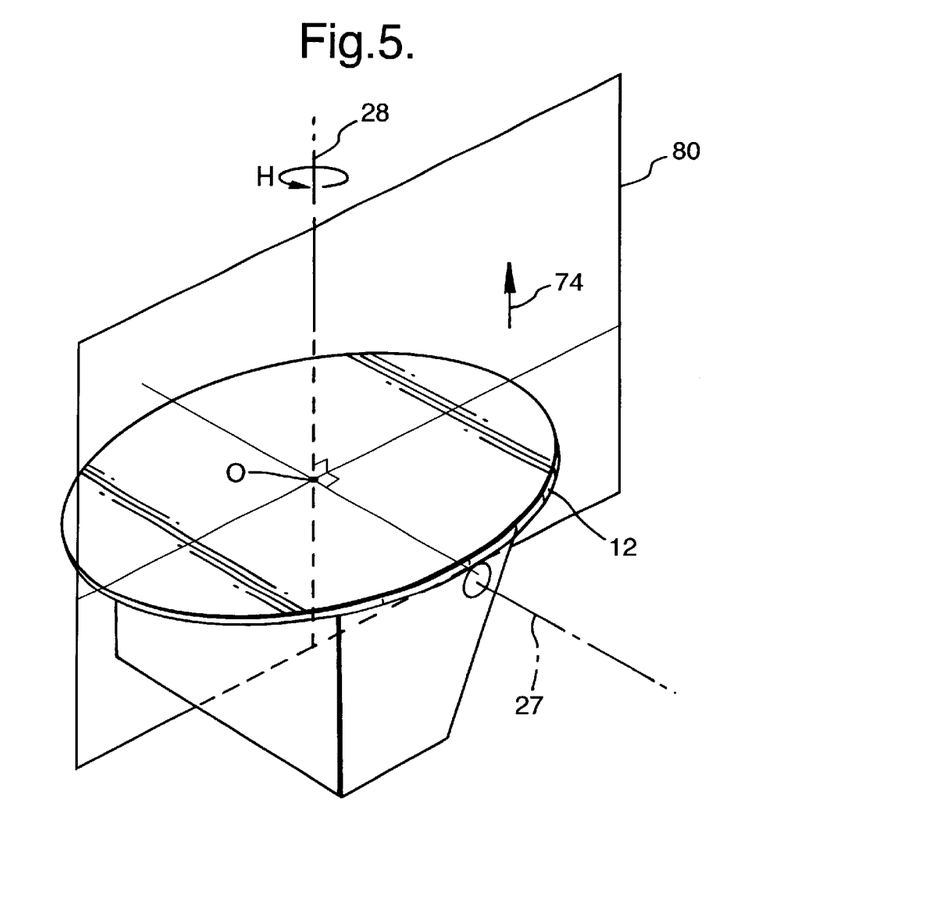
FIG. 5 is a pictorial illustration of the orientation and position of a welding plane used in an embodiment of the invention.

As shown in FIG. 5 the theoretical welding plane 80 is perpendicular to the tilting table axis 27 and passes through the table centre 0. Using this plane 80 the Welding post-processor 44 automatically specifies that the table 12 is rotated about axis 28 until the required x,y,z, position of the tool path 90 sits on the welding plane 80 with the tool vector 74 also falling within the welding plane 80 and still being vertical. Accordingly the welding torch 16 is constrained during welding deposition to this theoretical plane 80 with the robot 2 moving about its various axis 21 to 29 so as to produce the required path 90 and relative orientation of the welding torch 16 as specified by the tool vector 74. For example to execute the substantially circular tool paths 90 shown in FIGS. 6 and 7 the welding torch 16 is directed to be positioned, in a substantially fixed position within the welding plane 80 whilst the table is rotated H about axis 28. In a similar way other axis-symmetric paths, and so components, can be produced.

Non axis-symmetric, but circuitous, paths can also be achieved by rotating H the table about axis 28, and moving the welding torch 16 laterally as required within the welding plane 80. This method of rotating the table relative to the torch 16 to reproduce such paths 90 is considerably simpler and easier to achieve than programming the robot arm 10 to execute a circular, or circulatory, motion.

The welding torch 16 of the robot 2 can be rotated about axis 26, which in effect is rotation about the tool vector 74. Such rotation about the tool vector 74 is not specified within CAM machining or milling systems 42 since the cutters used in machining and milling rotate about this axis 26 during machining. An angular rotation about this axis 26 can not therefore be specified in such machining systems 42. This being the sixth degree of freedom not generally specified for machining operations. With MIG welding torches the angular position of the torch 16 about the tool axis 30 is unimportant since the welding electrode, which is also the consumable welding wire is central with respect to the torch 16 (and tool axis 30). However with certain welding torches 16 the angular orientation of the torch 16 about the tool/torch axis 74,30 is important. In particular with TIG welding torches 16 there is a central electrode and the welding wire is fed in from one side of the torch 16. With such TIG welding torches 16 the weld deposit is improved if welding wire feed is aligned with the direction of travel of the torch 16. This is also the case with certain laser welding techniques where weld material and the laser beam(s) are fed in from different sides of the torch 16. An algorithm within the Welding post-processor 44 therefore automatically sets a specified orientation of the tool and rotates the tool about the tool vector 74, and axis 26, as required. Thus defining the sixth degree of freedom of movement required for the welding robot 2. Using this algorithm the tool is aligned with the relative direction of travel of the tool 16 at that point. Alternatively a fixed orientation relative to the direction of travel at that point can be set using the algorithm, or an absolute orientation of the torch relative to the robot can be set.

The Robot programming file 66 output from Welding post-processor 44 is then imported into a Robot Programming package 46. An example of such a package 46 is GRASP supplied by BYG Systems Ltd (Nottingham, UK). The Robot programming package 46 uses a complete electronic definition of the robot 2 installation to verify the control programme. The verification is used to confirm the welding path 90 and movement velocity, acceleration, and reach of the complete robot 2. In addition it ensures that the robot 2 does not collide with various parts of the installation and/or the 20 component. The package 46 also checks that there are no singularity points and 'flipping' of the robot axes 21–29. Any undefined or constrained positions of the robot 2 axes 21–29 are also specified within this package 46 and the positions of the robot 2 about the axes 21–29 actually 25 calculated.

Figure 6:
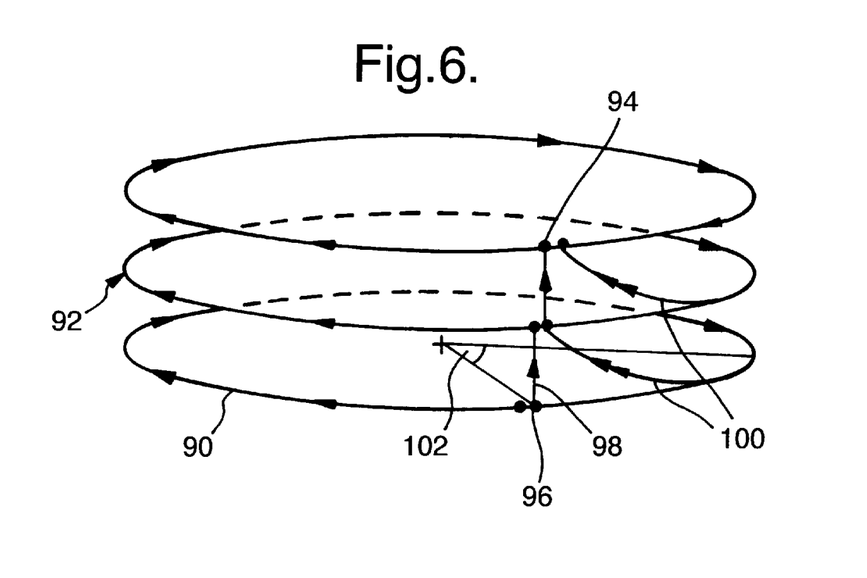
FIG. 6 is a schematic illustration of an example weld deposition path according to an embodiment of the present invention.

Within the robot programming package 46 any linear steps 98 within the required path 90 are identified, as shown in FIG. 6. In executing such linear steps 98 during weld deposition the welding torch 16 is conventionally turned off so that a build up in deposited material at that point does not occur. It has been found that this produces a discontinuity in the deposited component. This leads to porosity in the component deposited and affects the strength of the deposited component. Furthermore the discontinuity is visible in the finished component and affects the surface finish of the component, requiring subsequent machining to produce a final component of the correct shape and finish. To avoid these problems it has been recognised that the welding deposition should ideally be continuous or as near to continuous as possible. Consequently any linear steps 98 identified in the proposed welding deposition path 90 are replaced, in the robot programming package 98, by a gradual path 100 which changes over a distance without any dwell. Typically, and in particular, for substantially circular paths 90 as shown in FIG. 6 the weld path 90 is ramped up to the next level 92 over an angular sector 102 of the arc of the tool path 90 typically 40°. It will be appreciated that such ramping is not just limited to circular paths 90 but could be used for any other shaped paths, with a similar gradual ramping over a distance replacing a linear step 98. In this way the component to be deposited, or at least substantial sections of that component, are built up from a continuous weld bead deposit.

The output 66 from the Robot Programming package 46 is then used by a Robot controller 4 to produce a sequence of instructions 68 to actually drive the actuators on the robot axes 21–29 so that the robot 2 executes the required movements. The Robot controller 4 is specific to the particular robot 2. For example a Reis Robot controller 4, issuing instructions in Reis robot language, is used to drive the Reis Robot 2 described above.

In operation the welding robot 2 moves the welding torch 16 relative to the table 12 through the determined path 90. This path 90, as described above can comprise a number of sections. The path 90 is also of any required shape and is not limited to being circular as shown in the figures. When activated the welding torch 16 deposits a bead of weld material onto the table 12, previous weld deposits, or onto another component, following the path 90 of the torch 16. Gradually the weld deposits build up and a solid metal component corresponding to the geometry of the CAD model 60 is produced.

The above described method has the further advantage that, except for the Welding processor 44, it utilises, conventional computer systems 40,42,46,4,2 that are commonly available. It being appreciated though that these systems are used according to this method in a different, unconventional way. However the experience that has been derived from the other applications of such systems can be benefited from and the control system is more cost effective than developing a completely new, dedicated control system.

Using the above method commands and keywords for various operations and algorithms used within the system can be added to an initial datafile. These keywords and commands only having an effect upon some of the algorithms within the method. The keywords and commands being ignored and unmodified by the other algorithms and stages within the system to which they are not relevant. The various algorithms operating upon this initial datafile to produce final detailed control instructions/datafile to actually control the robot 2 and deposit welding of the component. In this way the initial datafile incorporating the required keywords and commands as well as the three dimensional definition (model) of the component is a complete, but simplified, description to produce the component with the subsequent algorithms and packages of the system adding the required, detailed, control information for the robot 2.

We claim:

1. A method of forming an article comprising in combination the steps of:

constructing in a computer memory or equivalent data storage means a first datafile which is a definition of a three dimensional volume model of an article;

executing a computer program, within a computer, which reads the first datafile and performs an algorithm which deconstructs the three dimensional volume model defined by the first datafile and produces a second datafile comprising a string of sequential relative spatial co-ordinates describing a tool path through the three dimensional volume model of the article;

operating a multi-axis welding robot comprising a worktable, worktable drive means, robot arm, welding head disposed on said robot arm, and control means that are arranged to control the movement of the welding robot and the welding head relative to the worktable, the control means utilising said second datafile to position the welding head relative to the worktable such that the relative movement follows the path defined by the second datafile, the operation of the welding head also being controlled to deposit a weld bead as it follows at least a part of the path to build up a solid representation of the three dimensional volume model of the article;

characterised in that the three dimensional volume model of the article is deconstructed by directing a computer representation of a tool within the algorithm to remove a succession of incremental volume portions from the three dimensional volume model of the article.

2. A method as claimed in claim 1 in which the deconstruction of the three dimensional model is executed using a computer aided machining system.

3. A method as claimed in claim 1 in which computer representation of the tool is a representation of a milling cutter which removes a comparable incremental volume as is deposited by the welding head.

4. A method of forming an article comprising in combination the steps of:

constructing in a computer memory or equivalent data storage means a first datafile which is a definition of a three dimensional volume model of an article;

executing a computer program, within a computer, which reads the first datafile and performs an algorithm which deconstructs the three dimensional volume model defined by the first datafile and produces a second datafile comprising a string of sequential relative spatial co-ordinates describing a tool path through the three dimensional volume model of the article;

operating a multi-axis welding robot comprising a worktable, worktable drive means, robot arm, welding head disposed on said robot arm, and control means that are arranged to control the movement of the welding robot and the welding head relative to the worktable, the control means utilising said second datafile to position the welding head relative to the worktable such that the relative movement follows the path defined by the second datafile, the operation of the welding head also being controlled to deposit a weld bead as it follows at least a part of the path to build up a solid representation of the three dimensional volume model of the article;

characterised in that the second datafile comprises a string of x,y,z co-ordinates representing the relative position of the tool along the path and for each x,y,z, co-ordinates a corresponding set of i,j,k co-ordinates which together with the respective x,y,z co-ordinates define a tool vector which represents the relative spatial orientation of the tool at a particular tool position along the path.

5. A method as claimed in claim 4 wherein a fixed plane is defined within a computer or the control means and the robot is controlled to position the tool within this plane such that the relative x,y,z co-ordinates and relative i,j,k co-ordinates are within this plane.

6. A method as claimed in claim 5 wherein the worktable is rotated to bring the article within said welding plane.

7. A method as claimed in claim 1 in which the welding head is arranged in use to be substantially vertical during operation of the welding head to deposit a weld bead and the worktable is tilted to provide a required relative tool orientation.

8. A method as claimed in claim 1 wherein the robot has more degrees of freedom of movement than are defined by the algorithm that deconstructs the three dimensional volume model of the article, and the method includes the additional step of executing an interface computer program within a computer which reads the second datafile and performs a further algorithm which uses further user specified constraints on the movement of the robot to alter the second data file before it is used by the robot control means.

9. A method as claimed in claim 8 wherein the further user specified constraints specify a rotational position and orientation of the tool about a tool vector.

10. A method as claimed in claim 8 wherein the rotational position and orientation of the tool about a tool vector is aligned with the direction of movement of the tool relative to the article, during at least part of the operation of the robot.

11. A method as claimed in claim 8 wherein the rotational position and orientation of the tool about a tool vector is, during at least part of the operation of the robot, fixed relative to the robot.

12. A method as claimed in claim 1 wherein the algorithm which deconstructs the three dimensional volume model defines up to five degrees of freedom of movement of the robot.

13. A method as claimed in claim 1 wherein the robot has more axes of movement than are defined by the algorithm that deconstructs the three dimensional volume model of the article, and the method includes the additional step of executing an interface computer program within a computer which reads the second datafile and performs a further algorithm which uses further user specified constraints on the movement of the robot about its axes to alter the second data file before it is used by the robot control means.

14. A method as claimed in claim 1 in which the robot has nine axes of movement.

15. A method as claimed in claim 1 in which the three dimensional volume model of the article defined in the first datafile is first broken into a number of sections and each section is then recorded in separate first datafiles which are then operated on in sequence by the further steps of the method.

16. A method as claimed in claim 15 in which the three dimensional volume model of the article has a number of similar sections, these similar sections are identified within the method as suitable translation and repetition of a first such similar section.

17. A method as claimed in claim 1 wherein any axis-symmetric shapes contained within the three dimensional volume model of the article are identified within the algorithm which deconstructs the three dimensional volume model and instructions are added to the second datafile such that the control means is directed to rotate the worktable of the robot to produce such shapes.

18. A method as claimed in claim 1 in which the algorithm that deconstructs the three dimensional volume model of the article constrains the tool to be substantially normal to the path defined through the article.

19. A method as claimed in claim 1 in which the welding head deposits a metal weld bead.

20. A method as claimed in claim 1 in which an electric arc welding head is used.

21. A method as claimed in claim 1 in which a Metal Inert Gas (MIG) welding head is used.

22. A method as claimed in claim 1 in which a Tungsten Inert Gas (TIG) welding head is used.

23. A method as claimed in claim 1 in which a laser welding head is used.

24. A method as claimed in claim 1 in which where a second portion of the tool path is arranged on top of a first portion of the tool path during deposition, the second portion of the tool path is modified to gradually ramp up to the position on top of the first portion over a suitable length of the path before the second portion of the path is required to be on top of the first portion.

* * * * *